United States Patent
Martinelli et al.

(10) Patent No.: US 7,116,470 B2
(45) Date of Patent: Oct. 3, 2006

(54) RAMAN AMPLIFYING DEVICE AND METHOD FOR PUMP MODULATION

(75) Inventors: Catherine Martinelli, Palaiseau (FR); Dominique Mongardien, Antony (FR)

(73) Assignee: Alcatel, Paris (FR)

( * ) Notice: Subject to any disclaimer, the term of this patent is extended or adjusted under 35 U.S.C. 154(b) by 75 days.

(21) Appl. No.: 10/815,845

(22) Filed: Apr. 2, 2004

(65) Prior Publication Data

US 2004/0201881 A1   Oct. 14, 2004

(30) Foreign Application Priority Data

Apr. 14, 2003 (EP) .................................. 03290921

(51) Int. Cl.
*H04B 10/17* (2006.01)
(52) U.S. Cl. ..................... 359/334; 359/337
(58) Field of Classification Search ................ 359/334, 359/337
See application file for complete search history.

(56) References Cited

U.S. PATENT DOCUMENTS

| | | | | |
|---|---|---|---|---|
| 6,452,716 | B1* | 9/2002 | Park et al. .................... | 359/334 |
| 6,456,426 | B1* | 9/2002 | Bolshtyansky et al. ...... | 359/334 |
| 6,587,260 | B1* | 7/2003 | Kikuchi et al. .............. | 359/334 |
| 6,611,368 | B1* | 8/2003 | Grant et al. .................. | 359/334 |
| 6,639,715 | B1* | 10/2003 | Naito et al. .................. | 359/334 |
| 6,704,135 | B1* | 3/2004 | Sasaoka et al. .............. | 359/334 |
| 6,844,961 | B1* | 1/2005 | Odate et al. .................. | 359/334 |
| 2002/0114029 | A1* | 8/2002 | Seydnejad et al. ........... | 359/110 |
| 2003/0035639 | A1* | 2/2003 | Okuno .......................... | 385/124 |
| 2003/0081307 | A1* | 5/2003 | Fludger et al. ............... | 359/334 |
| 2003/0202797 | A1* | 10/2003 | Seguineau et al. ........... | 398/155 |
| 2004/0190120 | A1* | 9/2004 | Torii et al. ................... | 359/334 |
| 2005/0110980 | A1* | 5/2005 | Maehara et al. ............. | 356/73.1 |

FOREIGN PATENT DOCUMENTS

EP   1 148 666 A2   10/2001
EP   1 298 766 A1   4/2003

OTHER PUBLICATIONS

Texas Instruments. Manual for the TI-83 Silver Edition. http://education.ti.com/guidebooks/graphing/83p/83m$book-eng.pdf Updated: Jul. 23, 2003 Downloaded: Jan. 5, 2006.*
Wolfram Research. Mathematica 5.2 Documentation. http://documents.wolfram.com/mathematica/functions/Min Updated: Jul. 5, 2005 Downloaded: Jan. 4, 2006.*
Chen et al, "Time domain characterization of transient effects and double Rayleigh backscattering noise in Raman amplifiers", Optical Fiber Conference, Mar. 17-22, 2002, pp. 634-636 XP002254393.

* cited by examiner

*Primary Examiner*—Jack Keith
*Assistant Examiner*—Ari M. Diacou
(74) *Attorney, Agent, or Firm*—Sughrue Mion, PLLC

(57) ABSTRACT

The invention is dealing with a Raman amplifying device comprising an optical path, pump sources for generating a plurality of Raman pump signals and means for coupling the plurality of Raman pump signals into the optical path for backward pumping. The plurality of optical Raman pump signals are time-division multiplexed by multiplexing controlling means and the controlling means apply a modulation frequency beyond the corner frequency of the co-propagating modulation transfer function. The method to modulate the time division multiplexed Raman signal gives a condition to avoid the increase of double Rayleigh scattering noise.

8 Claims, 5 Drawing Sheets

RAMAN AMPLIFYING DEVICE AND METHOD FOR PUMP MODULATION

BACKGROUND OF THE INVENTION

The invention is based on a priority application EP 03 290 921.0 which is hereby incorporated by reference.

The invention is related to a Raman amplifying device and in more detail to a Raman amplifying device for amplifying signals ($S_1, S_2 \ldots S_n$) with wavelengths $\lambda_{S1}, \lambda_{S2} \ldots \lambda_{Sn}$ comprising an optical path, pump sources ($P_1, P_2 \ldots P_N$) for generating a plurality of Raman pump signals ($\lambda_1, \lambda_2, \ldots \lambda_N$) for backward pumping and means for coupling ($2_1, 2_2, \ldots 2_N$)) the plurality of Raman pump signals into the optical path, wherein the plurality of optical Raman pump signals are time-division multiplexed by multiplexing controlling means ($4_1, 4_2, \ldots 4_N$). The invention is also related to a method for time multiplexing a plurality of Raman pump signals in an amplifying device.

Raman optical amplifiers are important components in optical communication systems. Optical fiber communication systems are beginning to achieve their great potential for the rapid transmission of vast amounts of information. In essence, an optical fiber system comprises a source of information-carrying optical signals, an optical fiber transmission line for carrying the optical signals and a receiver for detecting the optical signals and demodulating the information they carry. The signals are typically within a wavelength range favorable for propagation within silica fibers, and preferably comprise a plurality of wavelength distinct channels within that range.

Despite significant progress in reducing the attenuation characteristics of optical fibers, signals transmitted through them are attenuated by the cumulative and combined effect of absorption and scattering. Consequently long distance transmission requires periodic amplification.

One approach to optical amplification utilizes Raman effect amplification. In the Raman effect amplification, light traveling within a medium is amplified by the presence of lower wavelength pump light traveling within the same medium. The gain spectrum of a silica fiber pumped by a monochromatic Raman pump exhibits maximum gain when the signal to be amplified is at a frequency approximately 13 THz lower than the frequency of the Raman pump. The frequency (or wavelength) difference between the pump and the frequency (or wavelength) of maximum gain is often referred to as the Stokes shift, and the amplified signal is referred to as the Stokes wave. Use of a pump that is detuned from the signals by about one Stokes shift (½ the Stokes shift to 3/2 the shift) is referred to as first-order Stokes pumping.

It has also been observed that the gain is significantly larger for a co-polarized signal and pump. This polarization sensitivity can be eliminated if the pump is depolarized, polarization-scrambled or composed of two equally powerful polarized pumps that are polarization multiplexed.

Raman amplifiers can be categorized as either distributed or discrete. In distributed amplifiers, the transmission fiber itself is used as the gain medium. In discrete amplifiers, a separate fiber, typically optimized for Raman amplification, is used as the gain fiber. While the discrete amplifier gain fiber may be kilometers in length it is typically spooled at one location and not used to transfer information from one location to another. The term "Raman amplifier", as used herein, refers to both the pump and the gain medium.

A difficulty with conventional Raman amplifiers is that they are typically critically dependent on power sensitive components subsequent (downstream) to the pump. Often Raman pump sources utilize a plurality of sources to establish a high power first order pump (>100 mW) and an immediate downstream multiplexing component to combine the outputs into a pump with a wide, flat bandwidth. In typical amplifiers, the pump power is generated by an array of high power semiconductor pump lasers that are followed by wavelength-division multiplexers.

The problem with this amplifiers is the harmful interaction of the different pump source wavelengths traveling along the fiber.

With the recent ascendance of dense WDM and the commercial availability of several hundred mW output semiconductor pump laser the use of Raman amplifiers comes a good opportunity. Raman gain is now well used to overcome noise and non-linear penalties and to adapt the gain band according the available pump bands.

The EP 1 148 666 discloses a method to pump a Raman amplifier. The method involves time division multiplexing of combined pump wavelengths to attain broad Raman gain and to avoid the interaction of the different pump sources. This multiplexing scheme produces a flat gain spectrum. In the EP 1148 666 the modulation frequency that is required to keep the signal unaffected is specified with a few MHz.

However, Double Rayleigh Scattering noise (DRS) increases dramatically if no more precaution is taken. Indeed, as the Rayleigh noise co-propagates with the pump between the first and second backscattering, it experiences high variations of gain in a dB scale. As a result the average amount of DRS noise is much higher with a modulated pump than with a continuous pump that would give the same on-off gain.

The problem to solve is to realize pump modulation without rising high DRS penalty.

SUMMARY OF THE INVENTION

The problem of avoiding the increase of double Rayleigh scattering is solved by specifying conditions for time multiplexing the Raman pump signals.

The solution to avoid a DRS increase is to minimize the gain fluctuation of the noise that co-propagates with the Raman pump signal in the fiber. The solutions are:
- to increase the modulation frequency beyond the corner frequency of the co-propagating modulation transfer function and/or
- to reduce the corner frequency of the co-propagating modulation transfer function, which is function of the fiber material itself.

Without special conditions the technique of pump modulation is not profitable.

The solution is realized by a Raman amplifying device comprising an optical path, pump sources for generating a plurality of Raman pump signals and means for coupling the plurality of Raman pump signals into the optical path, wherein the plurality of optical Raman pump signals are time-division multiplexed by multiplexing controlling means and where the controlling means apply a modulation frequency beyond the corner frequency of the co-propagating modulation transfer function.

In another environment the Raman amplifying device is realized with an optical path with reduced corner frequency.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

DETAILED DESCRIPTION

Figure 1:
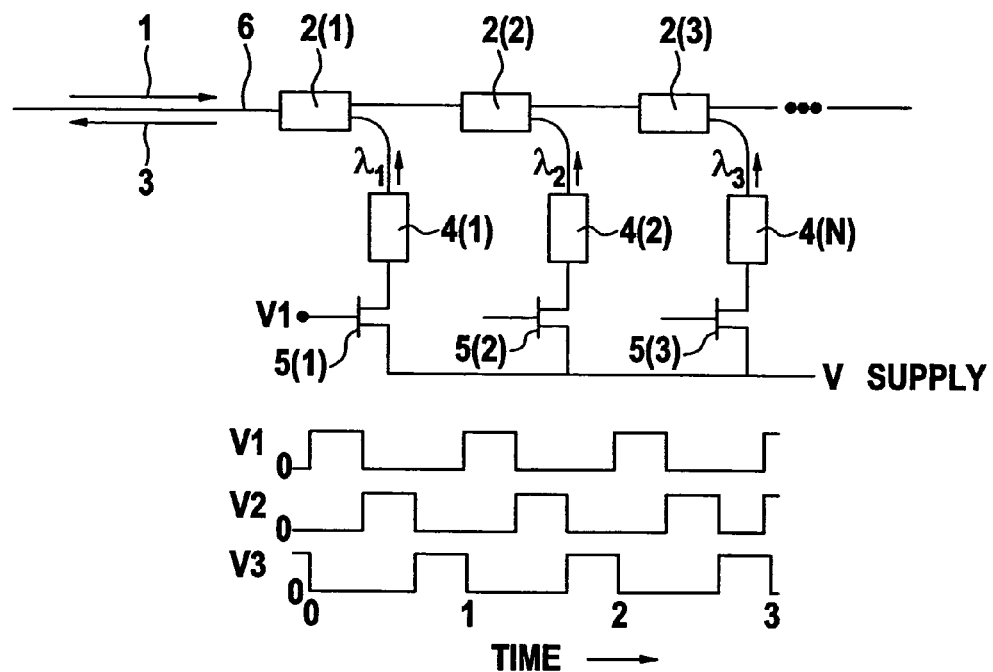
FIG. 1 schematically illustrates a first embodiment of a Raman amplifier using time multiplexed pumps.

Referring to the drawings, FIG. 1 illustrates a number of fixed wavelength lasers 4(1) . . . 4(N) are optically multiplexed together, but made to operate at separate times through the use of appropriately pulsed drive currents effected by voltage control gates 5 (1) . . . 5(N). Optical signals 1 traversing optical system 6 includes combined counter propagating Raman pump signal 3 produced by combining the output pumps of lasers 2 (1) to 2(N) which are coupled into the optical system 6 by couplers 2(1) to 2(N).

Figure 3:
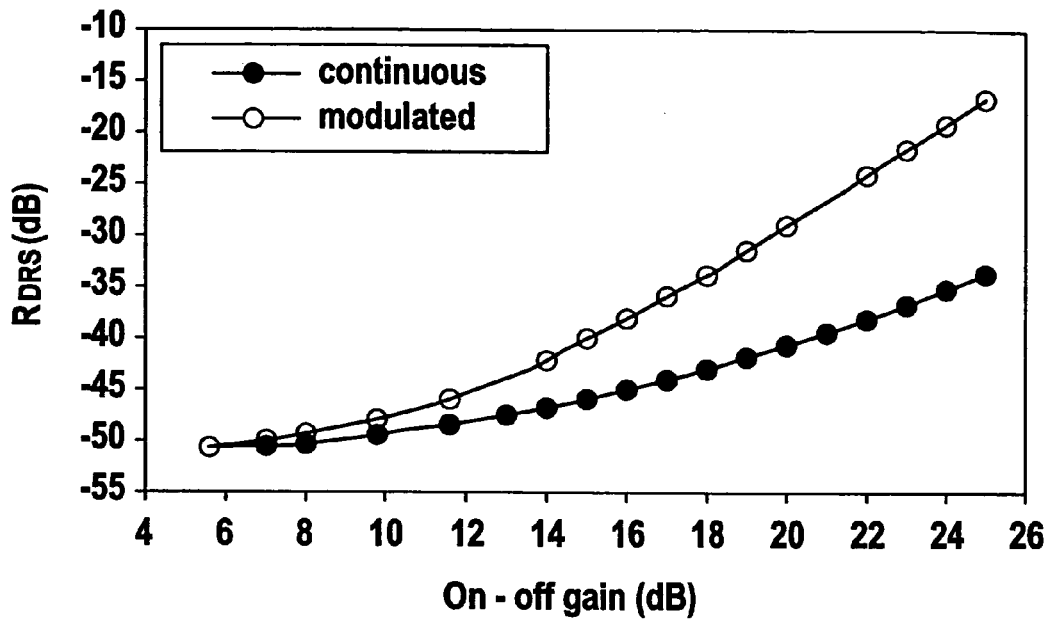
FIG. 3 is a simulation that shows the increase of DRS when pump modulation is operated with too low frequency

Without particular specifications pump modulation has damaging consequences. The worst case occurs for a signal that would be amplified by a single pump of the time-division multiplex (i.e. that does not benefit from gain from the other pumps of the multiplex) and when this pump is modulated with 100% extinction ratio. In FIG. 3, we have led simulations for a signal that would be in this case. In this example we consider a 100-km span of standard single mode fiber (SMF), the pump that gives the gain to the signal is modulated with 50% duty cycle and with a frequency that is too low to prevent total modulation transfer from the pump to the co-propagating (relative to pump) Rayleigh noise. The increase of DRS, for a Raman on-off gain of 17 dB applied on this signal, between the continuous and the modulated pumping scheme reaches 8 dB. In a example with a typical hybrid Raman-Erbium amplifying scheme, the integrated signal-DRS beating noise becomes comparable to the integrated signal amplified stimulated emission (ASE) beating noise. Thus pump modulation engenders an optical signal to noise ratio (OSNR) penalty of about 3 dB.

Here is the demonstration and the definition that we consider for the "corner frequency of the co-propagating pump-to-signal modulation transfer".

Let us consider a pump that is modulated in time, and the power of this Raman pump is:

$$P_p(t) = P_{Pmoy}(1 + \sin(2\pi ft))$$

For a long fiber, the accumulated gain at the end of propagation of a wave that co-propagates with the pump varies with time according to:

$$Gonoff_{dB}(t) = \frac{10}{\ln(10)} \frac{C_R P_{Pmoy}}{\alpha_P}\left(1 + \frac{\alpha_P}{\alpha_P^2 + b^2}(\alpha_P \sin(2\pi ft) + b\cos(2\pi ft))\right)$$

where $$b = 2\pi f\left(\frac{1}{V_S} - \frac{1}{V_P}\right)$$

$\alpha_P$ is the fiber loss coefficient at pump wavelength and $V_S$ and $V_P$ are the group velocities of the signal and the pump respectively.

$$\text{for } \left|\frac{b}{\alpha_P}\right| \ll 1, \; Gonoff_{dB}(t) = Gonoff_{moy}(1 + \sin(2\pi ft))$$

$$\text{for } \left|\frac{b}{\alpha_P}\right| \gg 1, \; Gonoff_{dB}(t) = Gonoff_{moy}\left(1 + \frac{1}{b/\alpha_P}\cos(2\pi ft)\right)$$

$$\text{for } \left|\frac{b}{\alpha_P}\right| = 1, \; Gonoff_{dB}(t) = Gonoff_{moy}\left(1 + \frac{\sqrt{2}}{2}\cos\left(2\pi ft - \frac{\pi}{4}\right)\right)$$

As a consequence, the modulation depth of the accumulated gain highly depends on the ratio $$\left|\frac{b}{\alpha_P}\right|.$$

Figure 2:
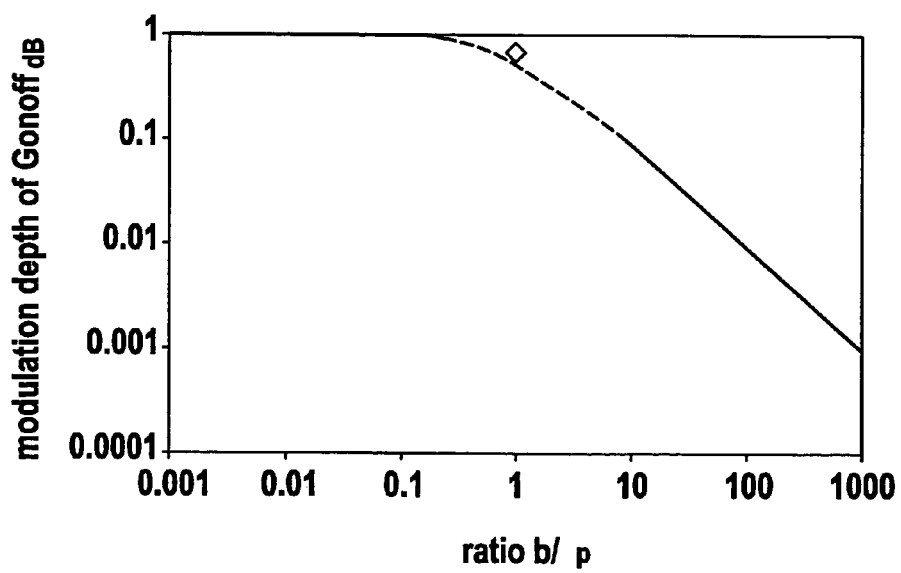
FIG. 2 is a simulation of the modulation depth of Raman gain

For low values of $$\left|\frac{b}{\alpha_P}\right|,$$

the modulation of the pump is totally transferred to the gain of the wave that co-propagates with the pump. A square modulation that gives a mean gain of 10 dB (i.e. ×10) to a signal that counter-propagates relative to the pump, will give 20 dB gain half of the time and 0 dB gain half of the time to any small noise that co-propagates with the pump. Consequently, this small noise will be amplified, in average, by a factor (100+1)/2≈50 instead of ×10 in the continuous pumping case.

$$\left|\frac{b}{\alpha_P}\right| > 1$$

is a key condition to get a significant decrease of the modulation depth of the accumulated gain. FIG. 2 shows the result of the calculation. The influence of the modulation frequency on the gain behavior can derive from this graph.

The quantity $$|b/\alpha_P| = 2\pi f\left|\frac{1}{V_S} - \frac{1}{V_P}\right|\Big/\alpha_P$$

is shown to be a key value in the co-propagating modulation transfer function. The invention imposes the condition to have this quantity greater than one. It is equivalent to say that the modulation frequency, f, must be greater than what we call the corner frequency $f_C$:

$$f_C = \frac{\alpha_P}{2\pi \left| \frac{1}{V_S} - \frac{1}{V_P} \right|}$$

It means that the invention optimize either on the modulation frequency or the characteristics of the fiber dispersion.

For instance, with a SMF we will have typically:

$$\left| \frac{1}{V_S} - \frac{1}{V_P} \right| = 1400 \text{ ps/km and } \alpha_P = 0.06/\text{km}.$$

According to our condition, the modulation frequency f must be greater than about 7 MHz.

The solution is also worth for limiting the noise that results from backward ASE backscattered by Rayleigh scattering.

An experiment has proven the increase of DRS with 1 MHz modulation and relatively low dispersion, i.e. without additional specifications according the invention. Simulations enable to evaluate the noise reduction expected from high frequency modulation or high walk-off.

Figure 4:
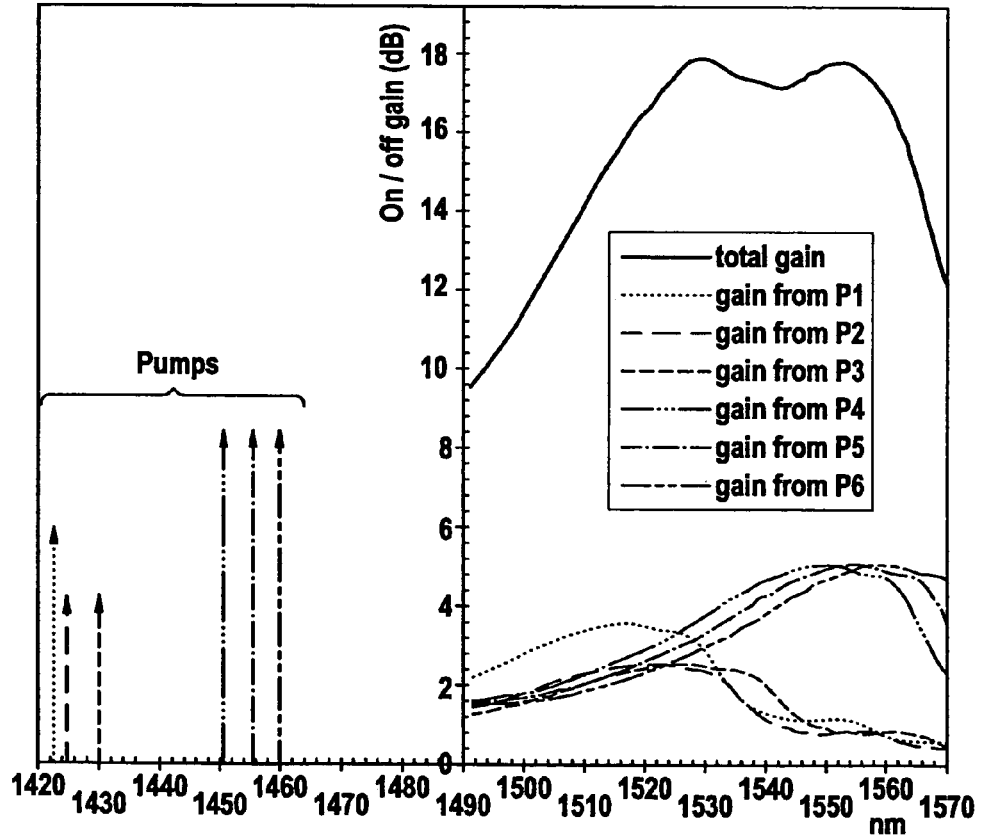
FIG. 4 is a scheme for an Raman amplifier with 6 pump wavelengths FIG. 5 to FIG. 7 give different time multiplexing schemes

As an example an amplifier with 6 pumps $P_i$, with i=1 to 6 is described according FIG. 4. The signals $S_k$, with k=1 to N, would lay from 1525 nm to 1560 nm for instance. If the pumps are time-division multiplexed (i.e. alternated in time) so that they do not propagate in the fiber at the same time, they will not interact. Then the total on-off Roman gain (in dB) of the particular signal $S_k$ is expressed in a simple way:

total gain $(S_k)=10/ln(10)*[Cr(\lambda_{P1},\lambda_{Sk})*P_{P1}*Leff_{P1}+ Cr(\lambda_{p2},\lambda_{Sk})*P_{P2}*Leff_{P2}+ \ldots +Cr(\lambda_{P6},\lambda_{Sk})* P_{P6}*Leff_{P6}]$ where Cr is the Raman efficiency of the fiber, $P_{Pi}$ is the time-average pump power of pump Pi and $Leff_{Pi}=(1-\exp(-\alpha_{Pi}L))/\alpha_{Pi}$ (L is the length of the fiber that composes the amplifier, $\alpha_{Pi}$ is the attenuation of the fiber at the wavelength of the pump Pi).

To design the amplifier with a defined gain curve the pumping wavelengths: $\lambda_{P1}, \lambda_{P2}, \ldots \lambda_{P6}$ are chosen. Then, corresponding to the shape of the Raman gain you have to fix the average pump powers $P_{P1}, P_{P2}, \ldots, P_{P6}$.

The signal Sk contra-propagates relative to the pump.

With these time-average pump powers you can start modulating the pumps in intensity according to the combinations you want without impacting on the signal gain provided the modulation frequency is greater than hundreds of kHz. In the following three examples of time-division multiplexing of the pumps of this particular amplifier are discussed. The three time multiplexing schemes are described in FIG. 5, FIG. 6 and FIG. 7.

The invention is to give further specification to perform pump modulation without giving rise to high DRS penalty on one of the amplified signals. The solution for that is to choose a combination of repetition of each pump that prevents high variations of gain for a noise that has the some wavelength as one of the signals that co-propagates with the pump. To be more precise, a noise that co-propagates with the pump will experience all the variations of gain associated to the variations of the pumps if these variations occur at a frequency that is below the corner frequency of the co-propagating pump-to-signal modulation transfer.

Figure 5:
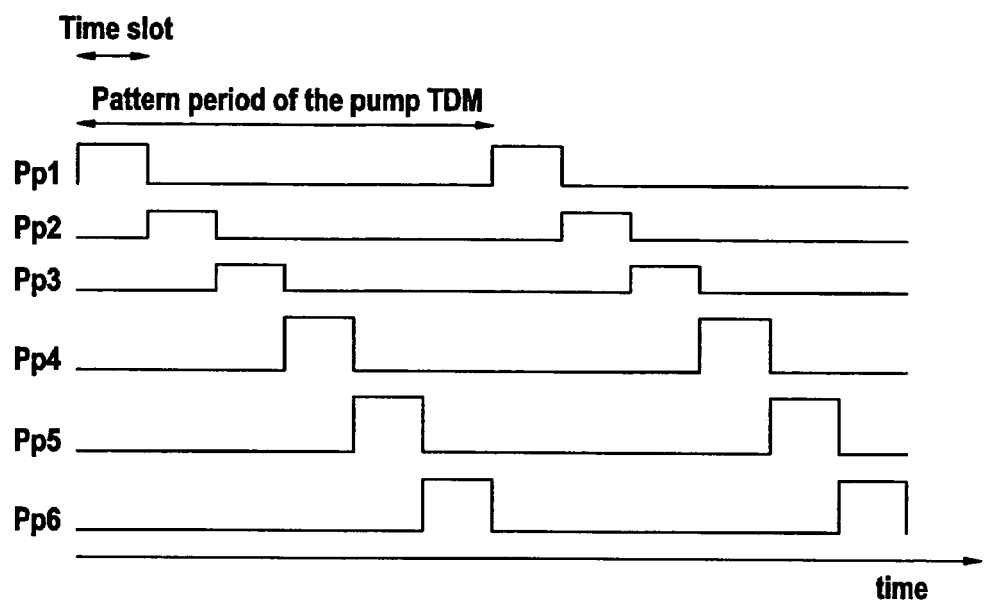
Figure 6:
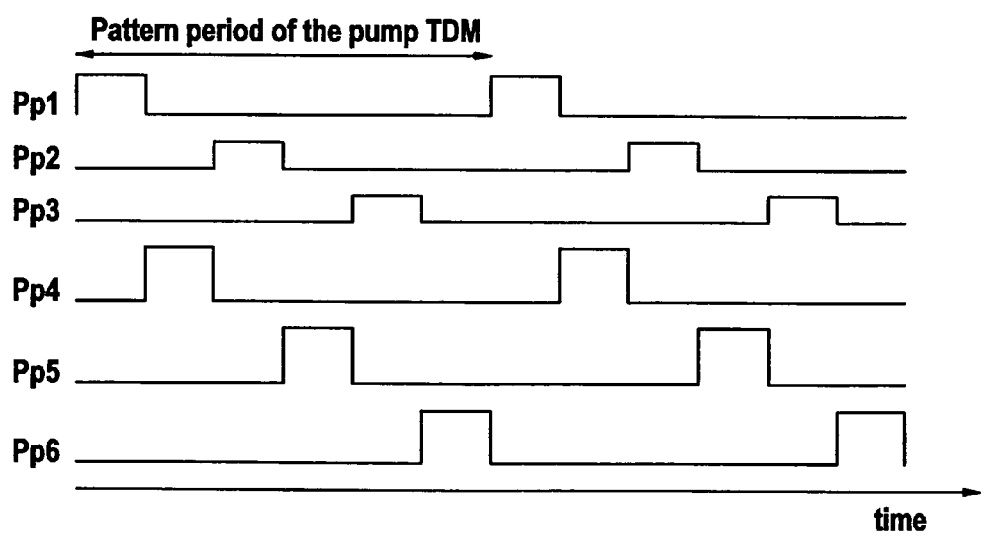
Figure 7:
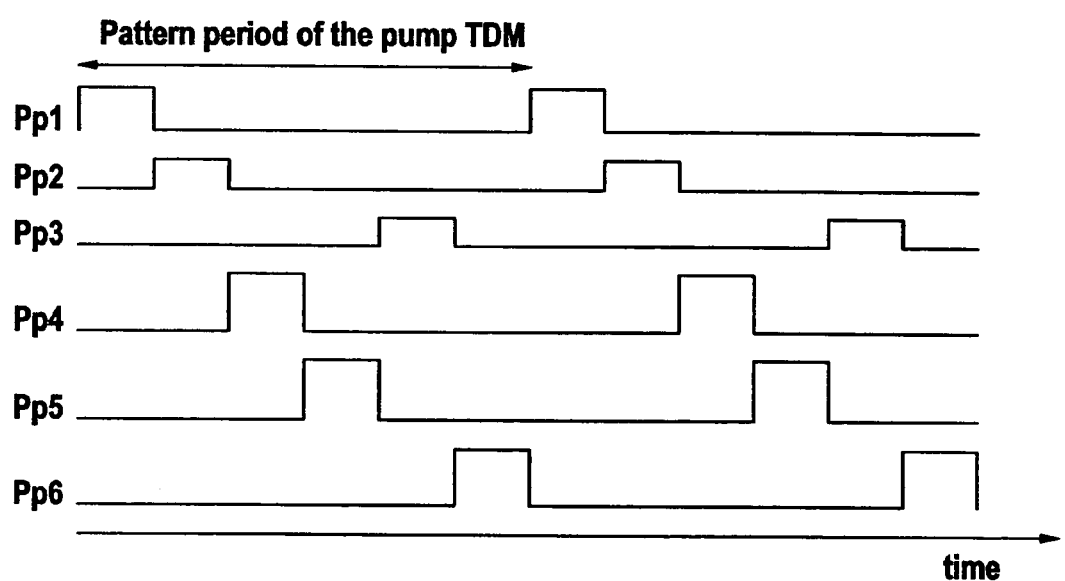
Figure 8:
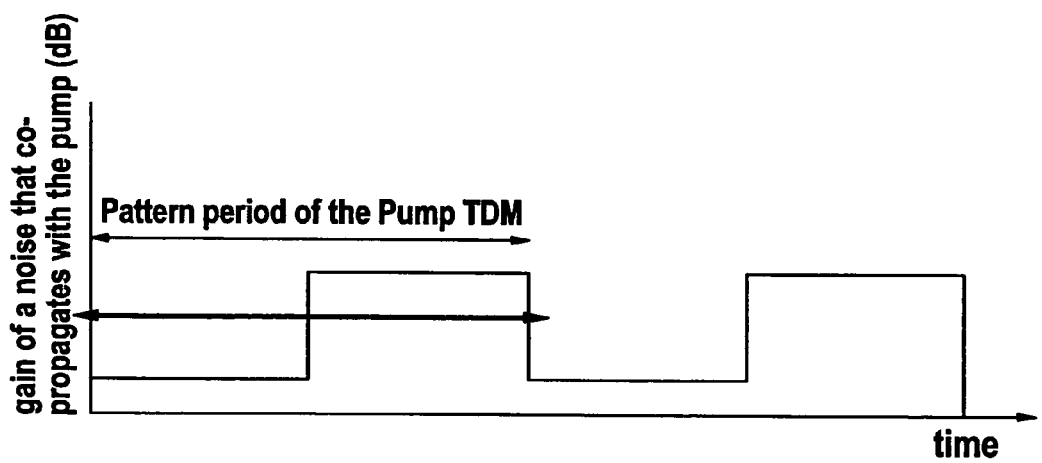
FIG. 8 to FIG. 10 show the gain of noise versus time for different multiplexing schemes.
Figure 9:
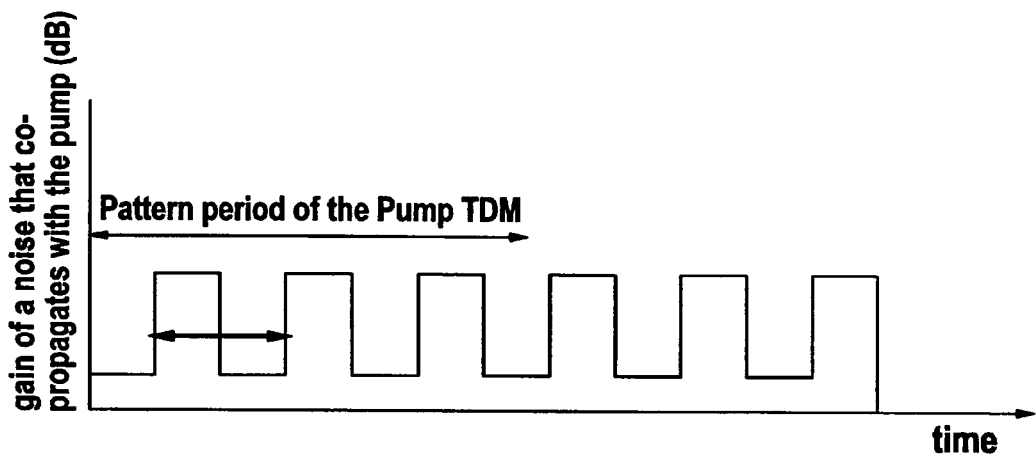
Figure 10:
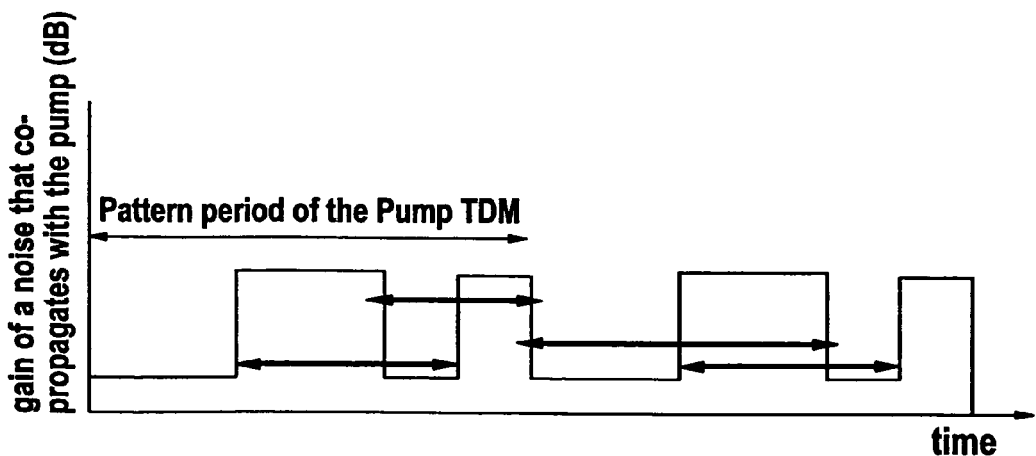

FIG. 8, FIG. 9 and FIG. 10 show the gain transferred to the noise that co-propagates with the pump at wavelength 1560 nm in the three examples of combinations for pump TDM according FIG. 5, FIG. 6 and FIG. 7.

A first necessary condition to limit the increase of DRS noise is that the frequency of the pump TDM, equal to 1/time slot (FIG. 5), is higher than the corner frequency of the co-propagating pump-to-signal modulation transfer (this condition is particularly appropriate in the case of the pump TDM pattern of FIG. 6, see FIG. 9). More than the frequency of the pump TDM, what is significant in the invention is the frequency at which the pumps that give gain to the signal under consideration are present or not (see FIG. 5 and FIG. 8). A condition of the invention, that is more precise, is that the period represented by the bold arrow in FIG. 8 and FIG. 9 respectively is smaller than 1/fc. The condition is also that the durations represented by the bold arrows in FIG. 10 are smaller than 1/fc.

For each signal wavelength $\lambda_{Sk}$, we separate the pumps in two groups: the pumps whose quantity $10/\ln(10)*Cr(\lambda_{Pi},\lambda_{Sk})*P_{Pi}*Leff_{Pi}$ is equal to a significant gain on the signal Sk and the pumps whose quantity $10/\ln(10)*Cr(\lambda_{Pi},\lambda_{Sk})*P_{Pi}* Leff_{Pi}$ is equal to a negligible gain on the signal Sk.

The condition to follow is: the period at which the first group of pumps alternates with the second group of pumps must be lower than 1/fc. It means that the time that a pattern "one or several pumps of the first group—one or several pumps of the second group" takes until the rise of one pump of the first group must be lower than 1/fc. In the same way, the time that a pattern "one or several pumps of the second group—one or several pumps of the first group" takes until the rise of one pump of the second group must be lower than 1/fc. This condition must be fulfilled for every signal wavelength $\lambda_{Sk}$.

In order to completely avoid the increase of DRS, the frequency of the pump TDM or the frequency at which we alternate the pumps that give significant gain and the pumps that do not give significant gain to the signal is in a preferred embodiment even be chosen ten times greater than $f_C$.

Note that in the example, a signal at 1530 nm for example is given significant gain by all the pumps of the multiplex thus no condition is necessary on the pump modulation frequency concerning this signal.

The invention claimed is:

1. A Raman amplifying device for amplifying signals ($S_1, S_2 \ldots S_n$) with wavelengths $\lambda_{S1}, \lambda_{S2} \ldots \lambda_{Sn}$ comprising an optical path, pump sources ($P_1, P_2 \ldots P_N$) for generating a plurality of Raman pump signals ($\lambda_1, \lambda_2, \ldots \lambda_N$) for backward pumping and means for coupling ($2_1, 2_2, \ldots 2_N$)) the plurality of Raman pump signals into the optical path, wherein the plurality of optical Raman pump signals are time-division multiplexed by multiplexing controlling means ($4_1, 4_2, \ldots 4_N$) for time-division multiplexing the plurality of optical Raman pump signals such that the time-division multiplexing frequency is higher than the minimal corner frequency $f_c$ of the co-propagating pump-to-signal modulation transfer function among the co-propagating pump-to-signal modulation transfer functions that implicate the signals ($S_1, S_2 \ldots S_n$) and the pumps ($P_1, P_2 \ldots P_N$):

$$f_C = \text{MIN}_{i,j} \left\{ \frac{\alpha_{Pi}}{2\pi \left| \frac{1}{V_{Sj}} - \frac{1}{V_{Pi}} \right|} \right\}$$

where $V_{Sj}$ and $V_{Pi}$ are the group velocities of the signal Sj and the Raman pump signal Pi, $\alpha_{Pi}$ is the attenuation of the fiber at the pump wavelength $\lambda_{Pi}$.

2. A Raman amplifying device for amplifying signals ($S_1, S_2 \ldots S_n$) according to claim 1 characterized in that the controlling means multiplexes the pumps in time so that the pumps that give significant gain to a signal Sk and the pumps that do not give significant gain to the signal Sk are alternated in time at a frequency that is higher than the minimal corner frequency $f_c$ of the co-propagating pump-to-signal modulation transfer function among the co-propagating pump-to-signal modulation transfer functions that implicate the signal Sk and the pumps ($P_1, P_2 \ldots P_N$) that give significant gain to Sk:

$$f_C = \text{MIN}_i \left\{ \frac{\alpha_{Pi}}{2\pi \left| \frac{1}{V_{Sk}} - \frac{1}{V_{Pi}} \right|} \right\}$$

where $V_{Sk}$ and $V_{Pi}$ are the group velocities of the signal Sk and the Raman pump signal Pi, $\alpha_{Pi}$ is the attenuation of the fiber at the pump wavelength $\lambda_{Pi}$.

3. Raman amplifying device according to claim 2 characterized in that the controlling means multiplexes the pumps in time so that the pumps that give significant gain to a signal Sk and the pumps that do not give significant gain to the signal Sk are alternated in time at a frequency that is higher than the maximal corner frequency $f_c$ of the co-propagating pump-to-signal modulation transfer function among the co-propagating pump-to-signal modulation transfer functions that implicate the signal Sk and the pumps ($P_1, P_2 \ldots P_N$) that give significant gain to Sk:

$$f_C = \text{MAX}_i \left\{ \frac{\alpha_{Pi}}{2\pi \left| \frac{1}{V_{Sk}} - \frac{1}{V_{Pi}} \right|} \right\}.$$

4. Raman amplifying device according to claim 2 characterized in that
the controlling means multiplexes the pumps in time so that the conditions expressed for Sk are fulfilled for all the signals Sk, k=1 to n.

5. Raman amplifying device according to claim 3 characterized in that
the controlling means multiplexes the pumps in time so that the conditions expressed for Sk are fulfilled for all the signals Sk, k=1 to n.

6. A Raman amplifying device according to claim 1 with a fiber wherein this fiber has a reduced corner frequency of the co-propagating modulation transfer functions.

7. Method for time multiplexing a plurality of Raman pump signals in a amplifying device for amplifying signals ($S_1, S_2 \ldots S_n$) with wavelengths $\lambda_{S1}, \lambda_{S2} \ldots \lambda_{Sn}$ comprising an optical path, pump sources ($P_1, P_2 \ldots P_N$) for generating a plurality of Raman pump signals ($\lambda_1, \lambda_2, \ldots \lambda_N$) for backward pumping and means for coupling ($2_1, 2_2, \ldots 2_N$)) the plurality of Raman pump signals into the optical path, wherein the plurality of optical Raman pump signals are time-division multiplexed by multiplexing controlling means ($4_1, 4_2, \ldots 4_N$) characterized by the step:

multiplexing the pumps in time so that the time-division multiplexing frequency is higher than the minimal corner frequency $f_c$ of the co-propagating pump-to-signal modulation transfer function among the co-propagating pump-to-signal modulation transfer functions that implicate the signals ($S_1, S_2 \ldots S_n$) and the pumps ($P_1, P_2 \ldots P_N$):

$$f_C = \text{MIN}_{i,j} \left\{ \frac{\alpha_{Pi}}{2\pi \left| \frac{1}{V_{Sj}} - \frac{1}{V_{Pi}} \right|} \right\}$$

where $V_{Sj}$ and $V_{Pi}$ are the group velocities of the signal Sj and the Raman pump signal Pi, $\alpha_{Pi}$ is the attenuation of the fiber at the pump wavelength $\alpha_{Pi}$.

8. Method according to claim 7 comprising the step: multiplexing the pumps in time so that none of the noises at wavelength $\lambda_{S1}$ and $\lambda_{S2}$ and $\ldots \lambda_{Sn}$ that co-propagates with the pump experiences high variations of gain in time.

* * * * *